US009635497B2

(12) United States Patent
Anderson et al.

(10) Patent No.: US 9,635,497 B2
(45) Date of Patent: Apr. 25, 2017

(54) SYSTEM AND METHOD FOR PROVIDING SECURE ACCESS TO A WIRELESS NETWORK

(71) Applicant: The Boeing Company, Chicago, IL (US)

(72) Inventors: Derek E. Anderson, Clinton, WA (US); Karn Kausal, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/852,778

(22) Filed: Sep. 14, 2015

(65) Prior Publication Data

US 2017/0078834 A1 Mar. 16, 2017

(51) Int. Cl.
*H04W 4/00* (2009.01)
*H04W 12/08* (2009.01)
*H04L 29/08* (2006.01)

(52) U.S. Cl.
CPC ............ *H04W 4/008* (2013.01); *H04L 67/12* (2013.01); *H04W 12/08* (2013.01)

(58) Field of Classification Search
CPC .................................................... H04W 4/008
See application file for complete search history.

(56) References Cited

U.S. PATENT DOCUMENTS

| | | | |
|---|---|---|---|
| 2006/0168647 A1* | 7/2006 | Chiloyan | H04L 63/0853 726/4 |
| 2008/0085691 A1* | 4/2008 | Harvey | H04B 7/18508 455/187.1 |
| 2013/0141223 A1* | 6/2013 | Brandsma | G06K 7/01 340/10.51 |

* cited by examiner

*Primary Examiner* — Tuan H Nguyen
(74) *Attorney, Agent, or Firm* — Economou Silfin LLP; John S. Economou

(57) ABSTRACT

A system and method are disclosed for controlling access by a portable electronic device (PED) to a wireless network. A near field communications (NFC) tag is affixed to each authorized PED. Each NFC tag is programmed to include an identification code for the associated portable electronic device. An NFC reader has an antenna that receives an information signal when the NFC tag on a PED is placed in close proximity to the antenna. The NFC reader also has an output for outputting the information contained within the information signal. An authorization module is coupled to the output of the NFC reader and to a router which controls access to the wireless network. The authorization module receives the information from the NFC reader and, if the information contains an identification code for a PED, configures the router to allow the PED having that identification code to access the wireless network.

18 Claims, 3 Drawing Sheets

SYSTEM AND METHOD FOR PROVIDING SECURE ACCESS TO A WIRELESS NETWORK

FIELD

This disclosure relates generally to a system and method for providing secure access to a wireless network, and, in particular, providing secure access to a wireless network on an aircraft.

BACKGROUND

Many aircraft include secure local area networks, including both wired and wireless networks. Such networks are secured by the use of digital certificates for authorized devices. The airline owner of such aircraft is responsible for maintaining a certificate revocation list for each network identifying previously authorized devices (i.e., devices assigned a valid digital certificate) which are no longer allowed access to such network. There has been an increased use of tablets or other types of portable electric devices (PED) as electronic flight bags (EFBs). Any PED used as an EFB must have an appropriate digital certificate to gain access to the aircraft wireless network. However, such PEDs, due to the portable nature thereof, are sometimes misplaced, lost or stolen. Because of the potential security breach when an authorized PED is misplaced, lost or stolen, airlines are required to immediately deactivate the aircraft's wireless networks until a Certificate Revocation List is updated, typically at the next regularly scheduled maintenance date. The maintenance and administration of the Certificate Revocation List can be labor intensive. In addition, the deactivation of the wireless networks can result in hardship to the crew and maintenance support staff due to the inability to access the wireless networks.

Accordingly, there is a need for a system and method for providing secure access to a wireless network which overcomes the problems recited above.

SUMMARY

In one aspect, a system for controlling access by a portable electronic device to a wireless network includes one or more near field communications tags. Each of the one or more near field communications tags is affixed to an associated portable electronic device and is programmed to include an identification code for the associated portable electronic device. Each of the associated portable electronic devices is authorized to access the wireless network. The system also includes a near field communications reader having an antenna for receiving an information signal when one of the one or more near field communications tags is placed in close proximity to the antenna and an output for outputting information contained within the information signal. The system further includes an authorization module coupled to the output of the near field communications reader. The authorization module is configured to receive the information from the near field communications reader and, if the information contains an identification code for a portable electronic device, to allow the portable electronic device having that identification code to access the wireless network.

In a second aspect, a method for controlling access by a portable electronic device to a wireless network. A near field communications tag is affixed to each portable electronic device authorized to access the wireless network. Each near field communications tag is programmed to include an identification code for the associated portable electronic device. One of the authorized portable electronic device is placed in close proximity to an antenna of a near field communications reader. An information signal is received at the near field communications reader via the antenna from the near field communications tag and information contained within the information signal is output on an output of the near field communications reader. The information from the near field communications reader is received at an authorization module. If the information contains an identification code for a portable electronic device, the portable electronic device having that identification code is allowed to access the wireless network.

In a third aspect, a system for controlling access by a portable electronic device to a wireless network includes a near field communications reader. The near field communications reader has an antenna for receiving an information signal when a near field communications tag affixed to an associated portable electronic device authorized to access the wireless network is placed in close proximity to the antenna. The near field communications receiver also includes an output for outputting information contained within the information signal. The system also includes an authorization module coupled to the output of the near field communications reader. The authorization module is configured to receive the information from the near field communications reader and, if the information contains an identification code for a portable electronic device, to allow the portable electronic device having that identification code to access the wireless network.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure provides a secure wireless network access system, particularly for but not limited to wireless networks used on aircraft, which offers an alternative to the use of digital certificates for authorized devices. The system disclosed in the present disclosure uses Near Field Communication (NFC)-type Radio Frequency Identification (RFID) technology to tag each PED which is authorized to use the wireless network. An NFC reader may communicate with an NFC tag only when the NFC tag is placed within a close proximity to the NFC reader antenna which is positioned within the secure flight deck (where access is limited to only authorized personnel). The NFC tag is preferably programmed by the airline-owner of the aircraft to contain a unique identifier for the associated PED, and may also be programmed to include additional information regarding the authorization level granted to the associated PED for the aircraft wireless network and the type of device (e.g., EFB PED, cabin PED or maintenance laptop PED). The NFC reader receives the information from the PED NFC tag and forward such information to an authorization module which updates a stored list of authorized devices (e.g., an Airline Approved Devices List) to include the newly received information. The Airline Approved Devices List is thus dynamically created onboard the aircraft before each flight, which avoids the need to have the airline deactivate all aircraft wireless networks if a PED becomes misplaced, lost or stolen. Furthermore, the Airline Approved Devices List for a particular aircraft is generated automatically at the aircraft by positioning the NFC Tag on each PED close to the NFC reader antenna installed in the secure flight deck. This significantly reduces the overhead previously required to generate and maintain the Airline Approved Devices List and may reduce or even eliminate the overhead for generating and updating the Certificate Revocation List.

Figure 1:
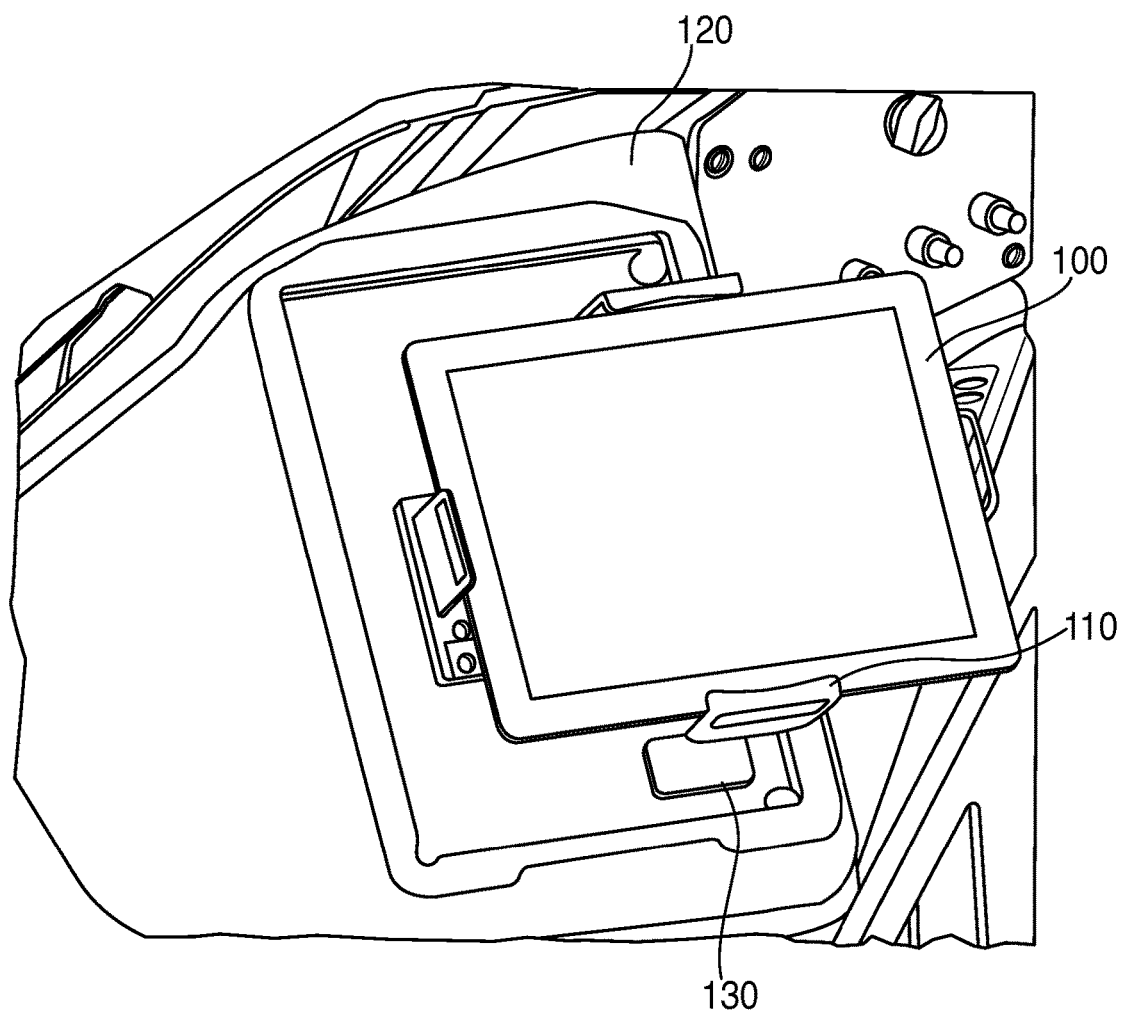
FIG. 1 is an illustration of a portable electronic device interface module according to an aspect of the present disclosure.

Referring now to FIG. 1, a PED 100 is shown installed on a mounting bracket 110 on a surface 120 of the flight deck. An NFC tag (not shown) is mounted on a rear portion of PED 100 and is in close proximity to NFC reader antenna 130. PED 100 is shown as a tablet computer in FIG. 1, but may be any type of portable electronic device that is capable of communicating with a wireless network, including but not limited to tablets, smart phones and laptop computers. Once the PED 100 is positioned in close proximity (e.g., within 4 inches) of NFC reader antenna 130, the NFC reader (shown and discussed in detail in FIG. 2) reads the information included within the NFC tag associated with PED 100, and then forwards such information to a network authorization module for dynamic update of the Airline Approved Devices List. Mounting bracket 110 is provided to hold PED 100 for convenient use in the flight deck area, but the NFC tag on PED 100 is read (and PED 100 is authorized) as soon as PED 100 is moved close to NFC reader antenna 130, whether or not PED 100 is mounted within mounting bracket 110. This enables the system to be used with any type of portable electronic device, including portable electronic devices too large or too small to be mounted within mounting bracket 110.

Figure 2:
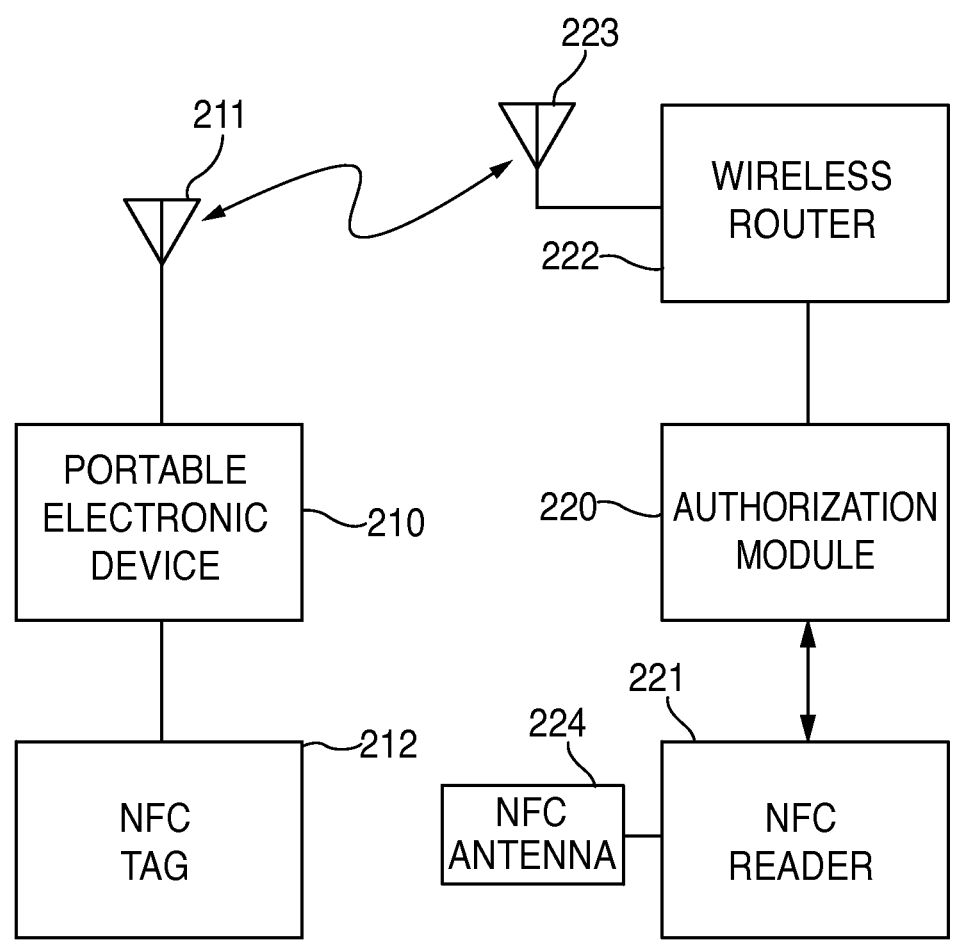
FIG. 2 is a block diagram of the secure wireless network access system of the present disclosure.

Referring now to FIG. 2, a secure wireless network access system 200 includes one or more PEDs 210, each having an integral antenna 211 for interfacing with a wireless network hosted by a wireless router 222 via an antenna 223. System 200 may be implemented in an aircraft, as shown in FIG. 1, but system 200 may be used in any application where access to a wireless network is limited to only pre-approved PEDs. Each PED 210 includes an NFC tag 212 affixed thereto. NFC tag 212 is assigned to PED 210 by the administrator of the wireless network and includes ID information for the associated PED 210. The NFC tag 212 may also include information about the access level provided to the user of PED 210 and about the type of device for PED 210. An NFC reader 221 is coupled to an authorization module 220, which in turn is coupled to the wireless router 222. NFC reader 221 is also coupled to an NFC antenna 224 (which may be integral to NFC reader in some embodiments). NFC reader 221 is configured to read information from any NFC tag (e.g., NFC tag 212 affixed to PED 210) which is positioned within close proximity to NFC antenna 224 and to forward such information to authorization module 220. Authorization module 220 is a computing system which builds an Airline Approved Devices List that identifies all the devices which may access the wireless network associated with wireless router 222. In some cases, the Airline Approved Devices List may include certain default devices which are always provided access to the wireless network (e.g., permanently installed wireless devices). In other cases, the complete Airline Approved Devices List is generated prior to a use (e.g., before a flight). Authorization module 220 is configured to receive the information from NFC reader 221 each time an NFC tag is read and, if such information is formatted properly to correspond to an ID of an authorized PED-type device, to add such information to the Airline Approved Devices List. Authorization module 220 is also configured to forward the Airline Approved Devices List to the wireless router 222 each time the Airline Approved Devices List is updated. In this manner, the Airline Approved Devices List is dynamically created prior to a particular use (e.g., prior to an aircraft flight) and can only include PEDs which are physically present in the area where the authorization module 220, NFC reader 221 and the wireless router 222 are installed. Thus, when system 200 is included in the flight deck area of an aircraft, only PEDs present in the flight deck having the proper NFC tag mounted thereon will be able to access the wireless network associated with system 200, and only after the NFC tag (e.g., NFC tag 212) is read by NFC reader 221 and the ID information for that PED (e.g., PED 210) is added to the Airline Approved Devices List.

Figure 3:
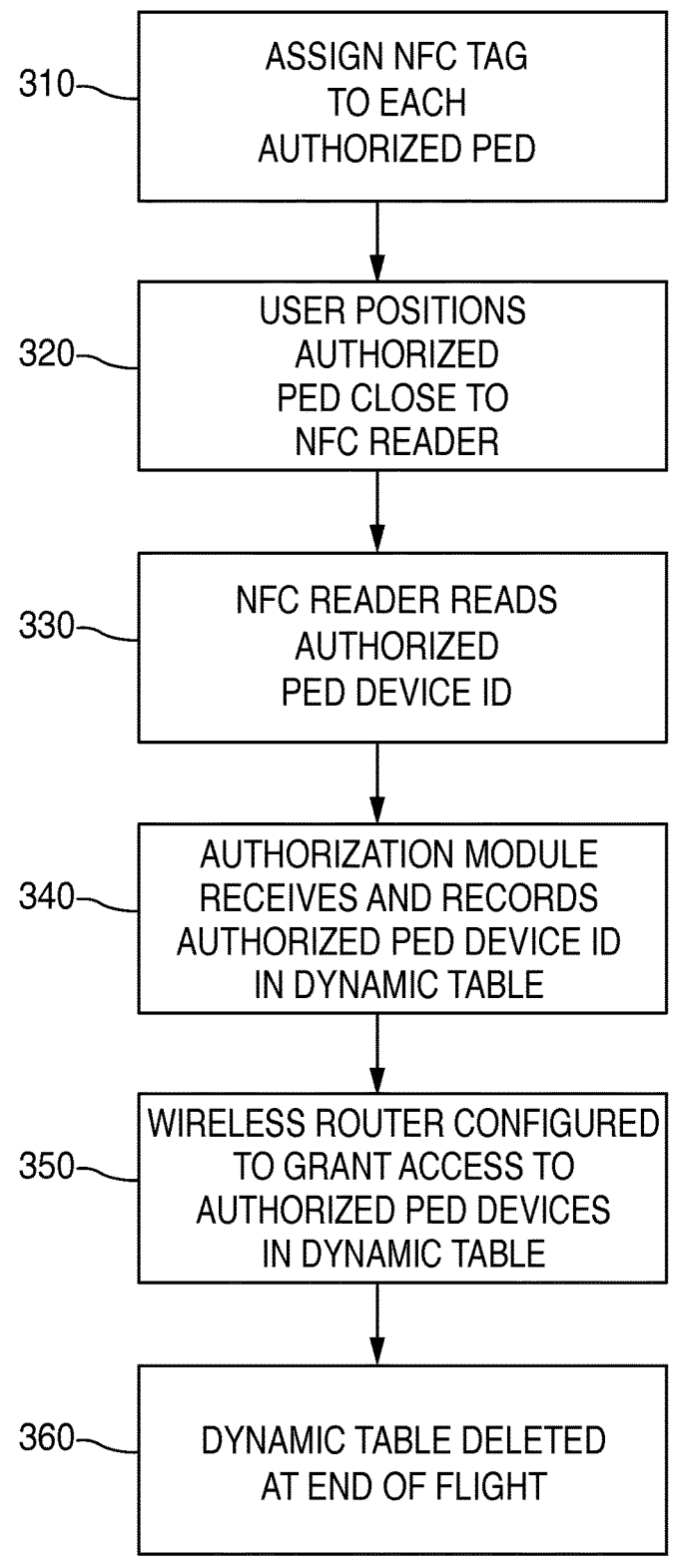
FIG. 3 is a flow chart of the operation of the secure wireless network access system of the present disclosure.

Referring to FIG. 3, a flowchart 300 shows the operation of system 200 in FIG. 2. First, at step 310, the wireless network administrator (e.g., the airline which owns the aircraft in which the wireless network is installed) assigns an NFC tag 212 to each PED 210 authorized to use the wireless network associated with system 200. The NFC tag 212 is affixed to the PED 210 and includes at least ID information for that PED. As discussed above, the NFC tag 212 may also include other information, including access level information and information identifying the particular type of PED. Next, at step 320, during first use of the wireless network of system 200, a user positions the authorized PED 210 close to the NFC antenna 224 for the NFC reader 221. The NFC reader 221, at step 330, reads the information from the NFC tag 212 affixed to the PED 210 and forwards that information to the authorization module 220. The authorization module 220, at step 340, receives and records the PED information (e.g., the device ID) into a dynamic table (i.e., the Airline Approved Devices List). The authorization module 220 then, at step 350, forwards the updated dynamic table to the wireless router 222 to grant access to PED 210 (at an access level which may be controlled by information read from NFC tag 212). Finally, at step 360, the completion of use of the wireless network of system 200 (e.g., at the completion of a flight), the dynamic table may optionally be deleted so that PED 210 may no longer have access to the wireless network of system 200 until reauthorization (via NFC reader 221)

Since the Airline Approved Devices List is created dynamically upon each use and since there is no need in system 200 to maintain a Certificate Revocation List (identifying PEDs having a previous authorization revoked), a great deal of overhead time in creating and maintaining these two lists is eliminated when using system 200. Furthermore, the elimination of the Certificate Revocation List removes any need to shut down the wireless network of system 200 when a previously authorized PED is misplaced, lost or stolen and the consequent difficulties which arise when such network is shut down.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for controlling access by a portable electronic device to a wireless network, comprising: one or more near field communications tags (212), each of the one or more near field communications tags (212) affixed to an associated portable electronic device (210) and programmed to include an identification code for the associated portable electronic device (210), each of the associated portable electronic devices (210) authorized to access the wireless network; a fixed near field communications reader (221) having an antenna (224) for receiving an information signal when one of the one or more near field communications tags (212) is placed in close proximity to the antenna (224) and the fixed near field communications reader (221) also having an output for outputting information contained within the information signal; and a fixed authorization module (220) coupled to the output of the fixed near field communications reader (221), the fixed authorization module (220) configured to receive the information from the fixed near field communications reader (221) and, if the information contains the identification code for an authorized portable electronic device (210), to allow that portable electronic device (210) to access the wireless network; and wherein the fixed near field communications reader (221) is installed within a secure area.

2. The system of claim 1, wherein the fixed authorization module is also coupled to a router (222) which controls access to the wireless network, and wherein the fixed authorization module (220) is configured to configure the router (222) to allow any authorized portable electronic device (210) to access the wireless network.

3. The system of claim 2, wherein the fixed authorization module (220) is configured to add the identification code of the portable electronic device (210) allowed to access the wireless network to a table of authorized portable electronic devices.

4. The system of claim 3, wherein the fixed authorization module (220) is configured to provide the table of authorized portable electronic devices to the router (222) to configure the router (222) to allow the portable electronic device (210) having that identification code to access the wireless network.

5. The system of claim 4, wherein the fixed authorization module (220) and the router (222) are configured to delete the table of authorized portable electronic devices at a predetermined time.

6. The system of claim 5, wherein the wireless network is installed in an aircraft and wherein the predetermined time is at completion of a flight by the aircraft.

7. The system of claim 1, wherein the wireless network is installed in an aircraft.

8. The system of claim 7, wherein the secure area is a flight deck portion of the aircraft.

9. The system of claim 1, wherein each of the one or more near field communications tags (212) is also programmed to include access level information defining an assigned level of access for the associated portable electronic device (210) to the wireless network, and wherein the fixed authorization module (220) is configured to allow the portable electronic device (210) having that identification code to access the wireless network only at an access level defined in the information from the fixed near field communications reader (221).

10. A method for controlling access by a portable electronic device (210) to a wireless network, comprising the steps of: programming a near field communications tag (212) for each portable electronic device (210) authorized to access the wireless network to include an identification code for the associated portable electronic device (210); affixing the programmed near field communications tag (212) to the associated portable electronic device (210); placing one of the authorized portable electronic devices (210) in close proximity to an antenna (224) of a fixed near field communications reader (221) installed within a secure area; receiving, at the fixed near field communications reader (221) via the antenna (224), an information signal from the near field communications tag (212) and outputting information contained within the information signal on an output of the fixed near field communications reader (221); receiving, at an authorization module (220), the information from the fixed near field communications reader (221); and if the information contains the identification code for one of the authorized portable electronic devices (210), allowing the portable electronic device (210) having that identification code to access the wireless network.

11. The method of claim 10, wherein the step of allowing the portable electronic device (210) having that identification code to access the wireless network includes the further step of configuring a router (222) which controls access to the wireless network to allow the portable electronic device (210) having that identification code to access the wireless network.

12. The method of claim 11, further comprising the step of, when the information from the fixed near field communications reader (221) contains the identification code for one of the authorized portable electronic devices (210), adding that identification code to a table of authorized portable electronic devices.

13. The method of claim 12, wherein the further step of configuring a router (222) which controls access to the wireless network to allow the portable electronic device (210) having that identification code to access the wireless network comprises providing the table of authorized portable electronic devices to the router (222).

14. The method of claim 13, further comprising the step of deleting the table of authorized portable electronic devices at a predetermined time.

15. The method of claim 14, wherein the wireless network is installed in an aircraft and wherein the predetermined time is at completion of a flight by the aircraft.

16. The method of claim 10, wherein the wireless network is installed in an aircraft and wherein the secure area is a flight deck portion of the aircraft.

17. The method of claim 10, wherein the programming step also programs each near field communications tag (212) to include access level information defining an assigned level of access for the associated portable electronic device (210) to the wireless network, and wherein the step of allowing the portable electronic device (210) having that identification code to access the wireless network only allows the portable electronic device (210) having that identification code to access the wireless network at an access level defined in the information from the fixed near field communications reader (221).

18. A system for controlling access by a portable electronic device (210) to a wireless network, comprising: a fixed near field communications reader (221) installed within a secure area having an antenna (224) for receiving an information signal when a near field communications tag (212) affixed to an associated portable electronic device (210) authorized to access the wireless network is placed in close proximity to the antenna (224) and, the fixed near field communications reader (221) also having an output for outputting information contained within the information signal; and a fixed authorization module (220) coupled to the output of the fixed near field communications reader (221), the fixed authorization module (220) configured to receive the information from the fixed near field communications reader (221) and, if the information contains the identification code for an authorized portable electronic device (210), to allow the portable electronic device (210) having that identification code to access the wireless network.

* * * * *